(12) United States Patent
Shinagawa

(10) Patent No.: US 7,177,268 B2
(45) Date of Patent: Feb. 13, 2007

(54) PACKET DISTRIBUTING DEVICE

(75) Inventor: Keiko Shinagawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1113 days.

(21) Appl. No.: 10/096,614

(22) Filed: Mar. 13, 2002

(65) Prior Publication Data

US 2003/0072261 A1   Apr. 17, 2003

(30) Foreign Application Priority Data

Oct. 17, 2001   (JP)   ............................ 2001-319724

(51) Int. Cl.
  *G01R 31/08*   (2006.01)
  *G06F 11/00*   (2006.01)
  *H04J 1/16*   (2006.01)

(52) U.S. Cl. ...................... 370/217; 370/218; 370/219; 370/242; 370/244; 370/230; 370/230.1; 370/232; 370/235; 709/223; 709/225; 709/229

(58) Field of Classification Search ..................... None
See application file for complete search history.

(56) References Cited

U.S. PATENT DOCUMENTS 4,592,049 A * 5/1986 Killat et al. ................. 370/460
6,502,135 B1 * 12/2002 Munger et al. ............. 709/225
6,925,054 B1 * 8/2005 Atterton et al. ............. 370/218

FOREIGN PATENT DOCUMENTS

JP        10336197      12/1998
JP       2001016206      1/2001

* cited by examiner

Primary Examiner—Chi Pham
Assistant Examiner—Raj K. Jain
(74) Attorney, Agent, or Firm—Katten Muchin Rosenman LLP

(57) ABSTRACT

Packets of different priorities are efficiently distributed to a plurality of links of different qualities. When transmitting a low priority packet, the load on a higher quality link is examined, and if the load is not greater than a predetermined value, the low priority packet is transmitted on the higher quality link. If the load on the higher quality link is greater than the predetermined value, the low priority packet is transmitted on the low quality link.

3 Claims, 11 Drawing Sheets

<HDLC FRAME FORMAT>

PACKET DISTRIBUTING DEVICE

BACKGROUND OF THE INVENTION

1. Field of the Invention

The present invention relates to a packet distributing device (for example, a router) for distributing packets of different priorities to a plurality of links of different qualities in accordance with the priorities of the packets.

2. Description of the Related Art

There are communication services that provide a plurality of links of different qualities between two endpoints; NTT's ATM MegaLink Extra Class Service and a multi-link service that bundles a plurality of lines into a single line are examples of such services. In such services, packets to be transmitted are assigned priorities according to the content or significance they represent, and packets of higher priority are transmitted on higher quality links and packet of lower priority on lower quality links, that is, each packet is always sent out on a link predetermined according to the priority assigned to the packet, so that packets of different priorities are not transmitted in a mixed fashion on the same link. In the ATM MegaLink Service, automatic switching is performed in the event of a link failure; in that case also, packets are always sent out according to the preassigned priority, and packets of different priorities do not use the same link.

With the prior art method that transmits packets always on predetermined links, if the number of packets assigned lower priority is quite large compared with the number of packets assigned higher priority, packet overflow may occur because the usage of the lower quality link becomes extremely high while the usage of the higher quality link is very low. Thus, in the prior art, a situation can occur where efficient use of the higher quality link cannot be made when enough capacity is left on the high quality link. Further, in a network that provides a plurality of links of different qualities, with provisions made for automatic switching to the next lower quality link in the event of a link failure, there arises the problem that when the switching is made, transmission of the lowest priority packets that use the lowest quality link cannot be effected at all.

SUMMARY OF THE INVENTION

Accordingly, in a communication service, such as those described above, that provides a plurality of links of different qualities and distributes packets to the respective links in accordance with the priorities assigned to the packets, it is an object of the present invention to provide a packet distributing device that can make effective use of the links.

According to the present invention, there is provided a packet distributing device for distributing packets of different priorities to a plurality of links of different qualities in accordance with the priorities of the packets, comprising: means for comparing a link load with a predetermined threshold value for a link having a higher quality than the quality corresponding to the priority of the packet to be transmitted; and means for distributing the packet to the link when the load on the link is found by the comparing means to be not greater than the predetermined threshold value.

Preferably, the device further comprises means for changing a preassigned packet priority to the highest priority for any packet whose order of arrival needs to be maintained.

It is desired to utilize higher quality links as effectively as possible. However, in the prior art, where each packet is always transmitted on a link predetermined according to the preassigned priority, the load condition (communication condition) of each link depends on the preset priority irrespective of the link quality. That is, in the prior art, if the links are to be utilized effectively, it has been necessary to set packet priority by considering link load in advance.

When the packet distributing device of the invention is used, there is no need to consider link load and, by just preassigning packet priority according to the content (significance) of each packet, the links can be used effectively in order of quality.

Further, with the prior art method that transmits packets always on predetermined links, in the event of a link failure, packets assigned to the failed link have been rendered untransmittable; by contrast, when the method of the invention is employed, such packets can be transmitted as long as enough capacity is available on a higher quality link. Furthermore, in a network where link switching is performed, packets assigned to the lowest priority link have been rendered untransmittable in the prior art in the event of a failure of a higher priority link, but when the method of the invention is used, such packets can be transmitted as long as enough capacity is left on some other link.

Certain protocols (for example, a bridge protocol) require that the order of arrival of packets be retained. In such cases, if packets based on such protocol are sent out on different links by the distributing device of the invention, the packets may arrive out of order, resulting in an error. If provisions are made to transmit such packets on the highest quality link regardless of the user assigned priority, the order of arrival can be retained because the packets are not sent out on different links. Accordingly, for packets based on such a protocol, the priority changing means automatically assigns the highest priority so that the packets are always transmitted using the highest quality link regardless of the user set priority. This allows the use of a protocol that requires packets to arrive in predetermined order, without the user having to aware of it.

DESCRIPTION OF THE PREFERRED EMBODIMENTS

Figure 1:
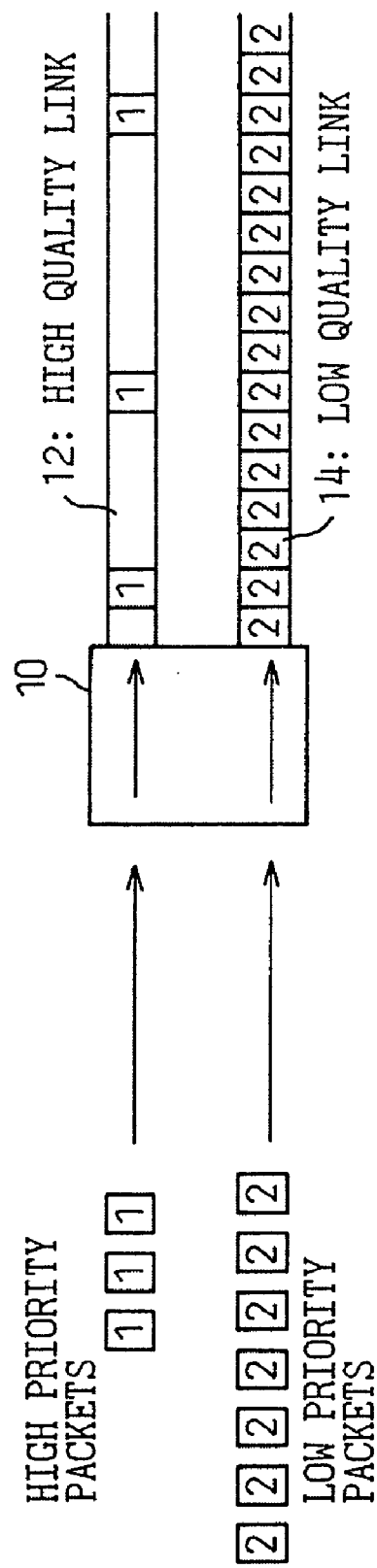
FIG. 1 is a diagram for explaining how packet distribution is performed in the prior art.

FIG. 1 shows the process of packet distribution according to the prior art when a high quality link 12 and a low quality link 14 are provided as an example of the configuration where a plurality of links of different qualities are provided.

As shown in FIG. 1, in the prior art, when high priority packets and low priority packets are received at a router 10, the high priority packets are always transmitted out onto the high quality link 12 and the low priority packets onto the low quality link 14. In the prior art, therefore, it has not been possible to make effective use of the high quality link 12 when it is sparsely loaded with high priority packets.

Figure 2:
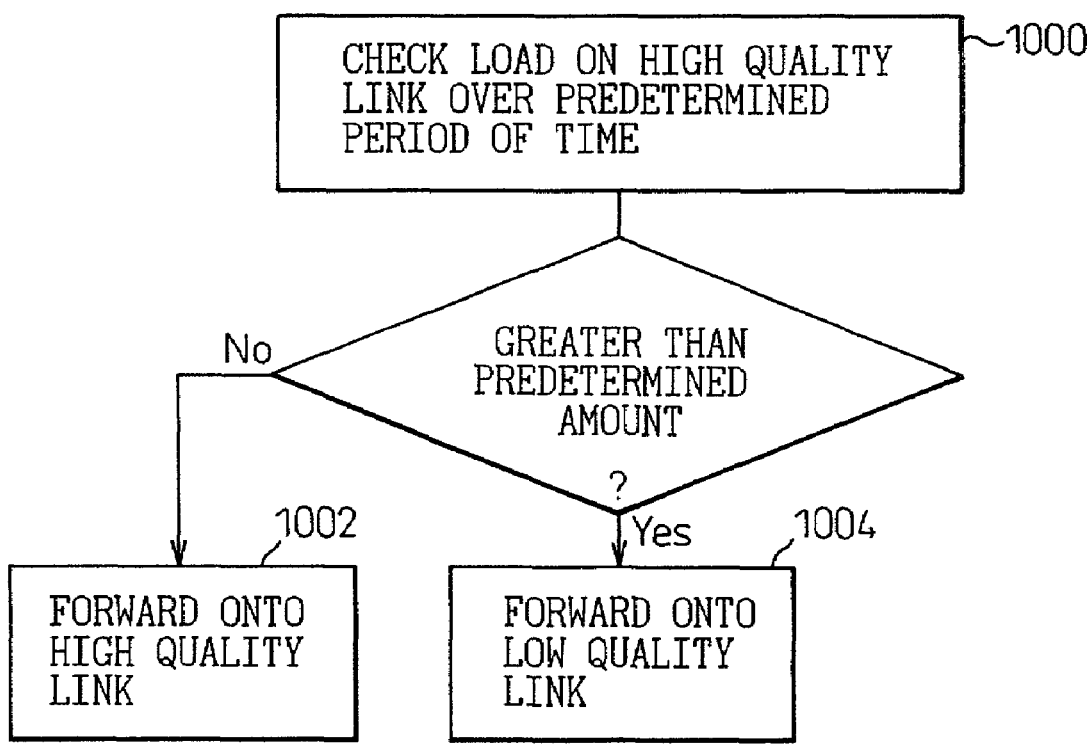
FIG. 2 is a flowchart showing one example of packet distribution according to the present invention.
Figure 3:
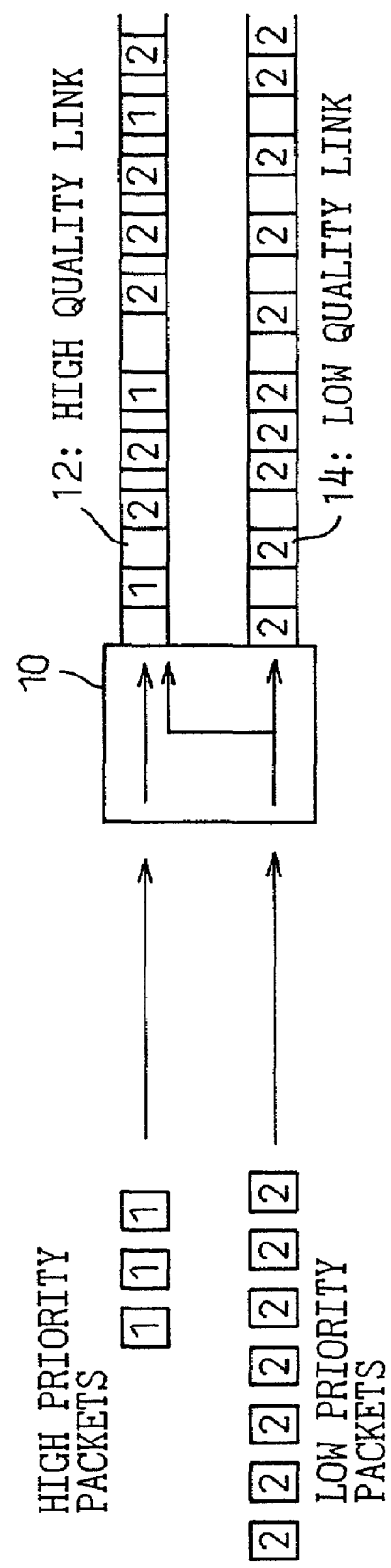
FIG. 3 is a diagram showing one example of packet distribution according to the present invention.

In the present invention, as shown in FIG. 2, when transmitting a low priority packet, the router 10 checks the load on the high quality link 12 (step 1000). When the load on the high quality link, over a predetermined period of time, that is, the bit rate or the cell rate, is not greater than a threshold value, it is determined that enough capacity is left on that link to carry the low priority packet, and the low priority packet is transmitted onto the high quality link 12 (step 1002). As a result, as many packets as the capacity left on the high quality link 12 allows can be transmitted on the high quality link 12, as shown in FIG. 3, and effective use can thus be made of the high quality link.

Figure 4:
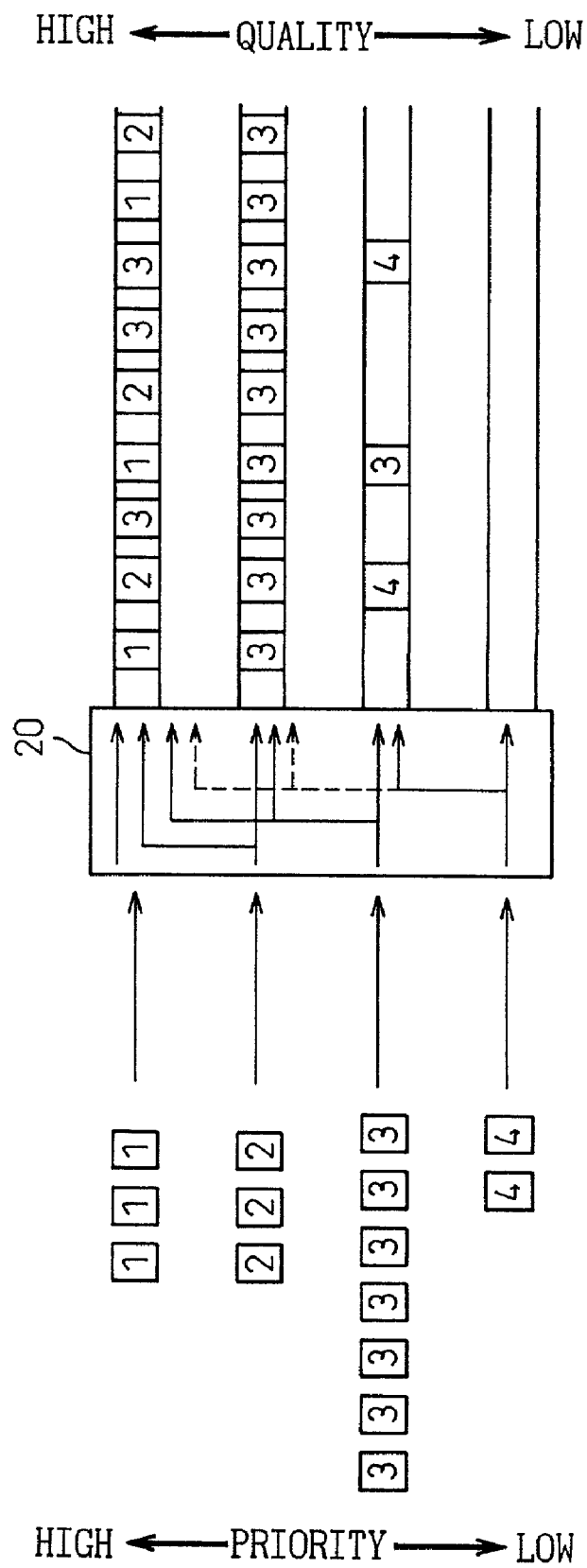
FIG. 4 is a diagram showing packet distribution when four links are provided.
Figure 5:
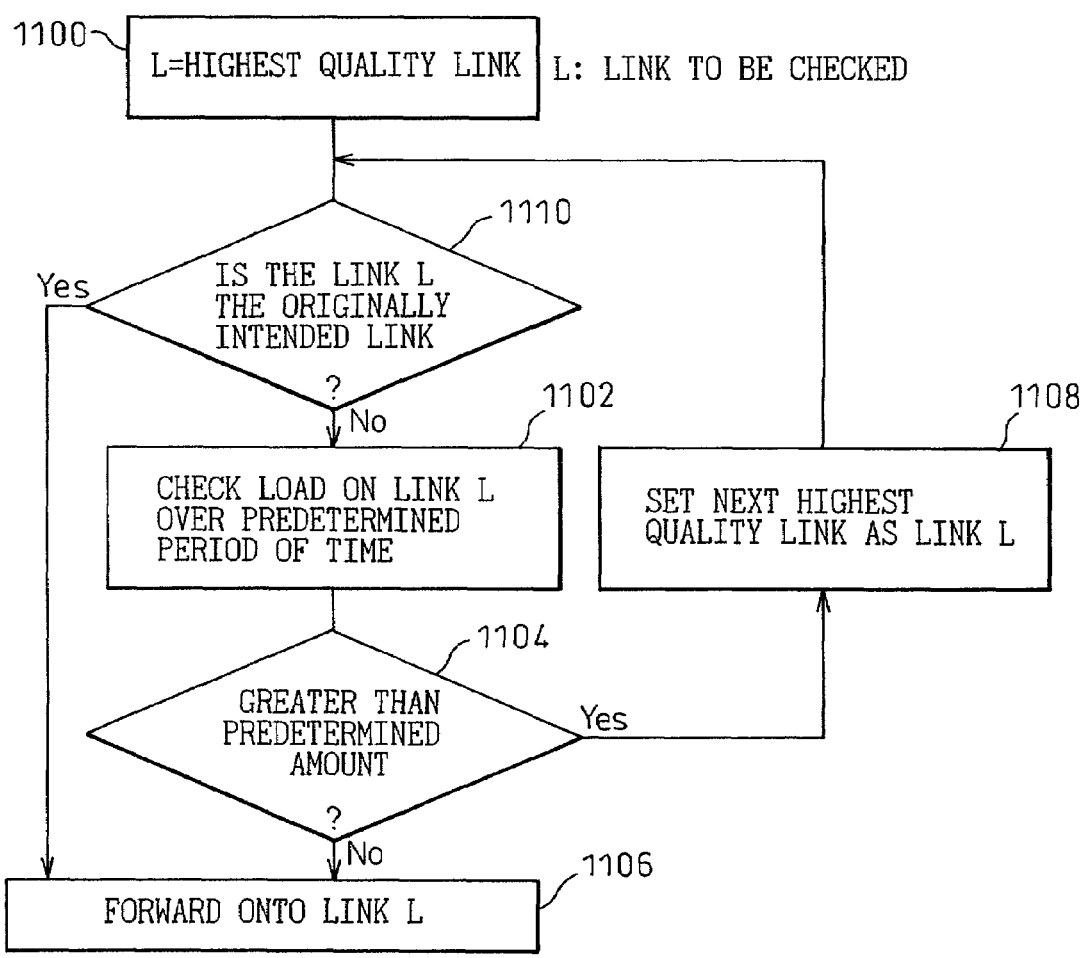
FIG. 5 is a flowchart showing one example of the packet distribution of the present invention when three or more links are provided.

A similar technique can be applied to the configuration where three or more links are set up between two endpoints. FIG. 4 shows the case where four links are set up. As in the two-link configuration, when transmitting a packet, the router 20 checks whether a link of higher quality than the quality of the originally assigned link has enough capacity to carry the packet, and whether the transmission of the packet does not affect the transmission of higher priority packets; when these two conditions are satisfied, the router 20 transmits the packet onto the higher quality link. In this way, packets can be transmitted out using higher quality links. An example of this process is shown in flowchart form in FIG. 5. In FIG. 5, a variable L indicating the link to be checked is set to point to the highest quality link (step 1100), and the load on the link L is checked (step 1102). If the load on the link L is not greater than a predetermined amount (step 1104), the packet is sent out on that link (step 1106). If the load on the link L is greater than the predetermined amount, the next highest quality link is set as the link L to be checked (step 1108), and the load on the link L is checked. This process is repeated until the link L becomes the link on which the packet is originally intended to be transmitted (step 1110).

Figure 6:
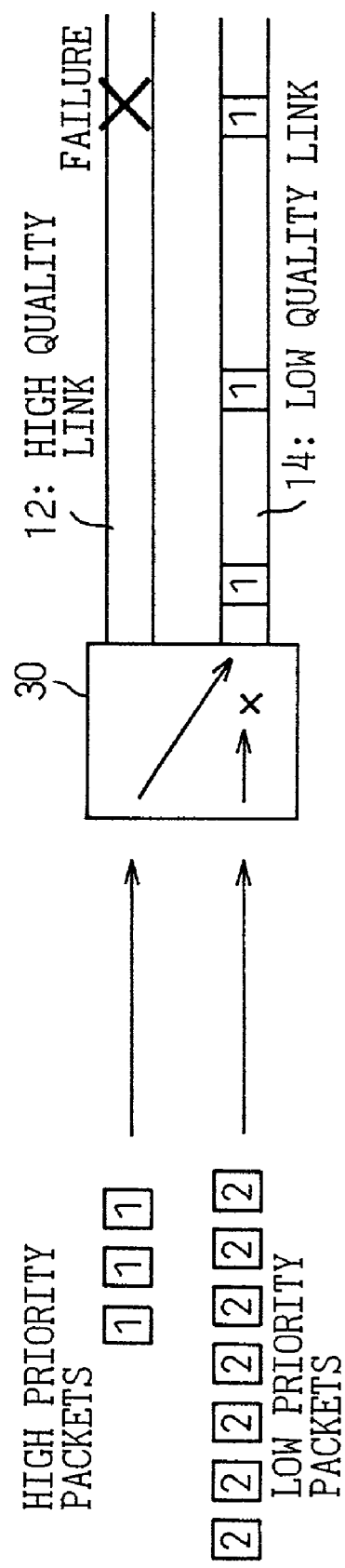
FIG. 6 is a diagram for explaining how automatic link switching is made in the event of a failure.
Figure 7:
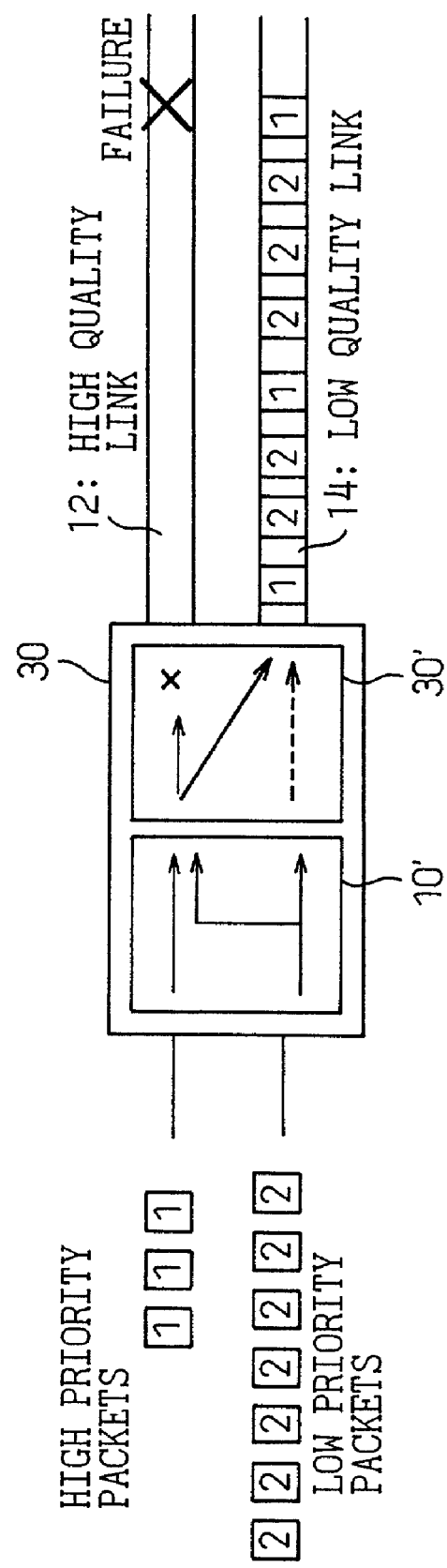
FIG. 7 is a diagram for explaining how the distribution function of the invention is effected in a communication service where automatic switching is performed in the event of a failure.

It is known to provide a service (for example, ATM MegaLink Extra Class Service) as shown in FIG. 6 where two links of different qualities are provided between two endpoints and, in the event of a failure on the higher quality link 12, automatic switching is made by the router or switch 30 to the lower quality link 14 to guarantee transmission of high priority packets. In this case, if the higher quality link fails, transmission of lower priority packets will be rendered impossible; however, as shown in FIG. 7, when a packet distributing function 10' having the same function as the router 10 of FIG. 3 is placed before the link switching function 30' of the router or switch 30, lower priority packets can also be transmitted out, provided that the link has enough capacity to transmit the higher priority packets and yet the transmission of the lower priority packets does not affect the transmission of the higher priority packets.

Figure 8:
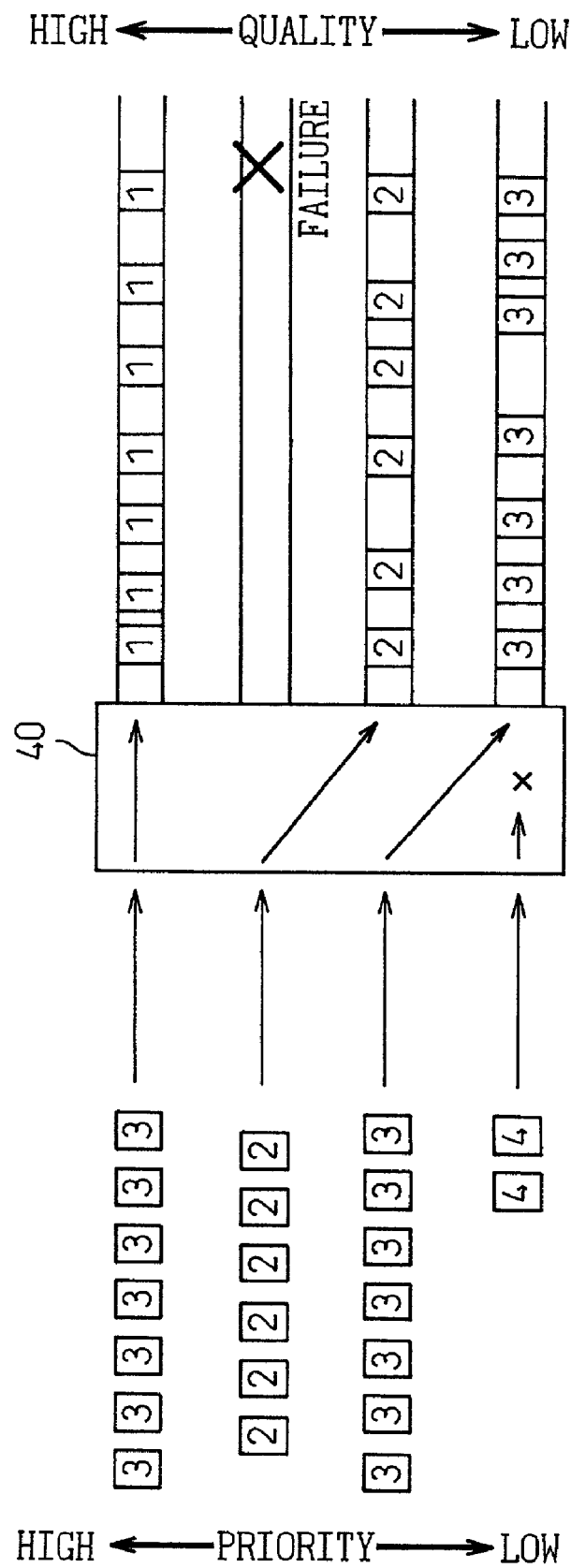
FIG. 8 is a diagram for explaining how automatic switching is done when four links are provided.
Figure 9:
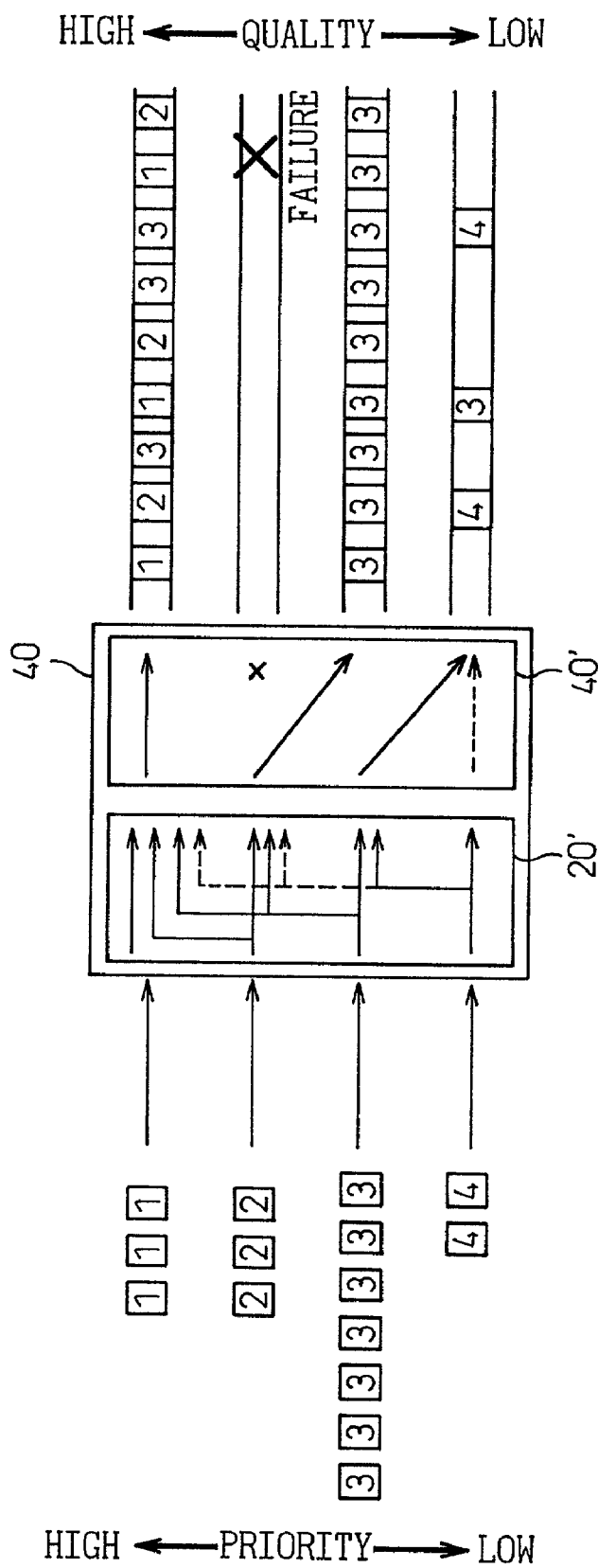
FIG. 9 is a diagram for explaining how the packet distribution function of the invention is effected in the service shown in FIG. 8.

The same applies to the case where three or more links are set up between two endpoints. FIGS. 8 and 9 show the case where four links are set up. Similarly to the two-link configuration, if a failure occurs on one of the links, automatic switching is made by the router or switch 40, as shown in FIG. 8, rendering the transmission of the lowest priority packets impossible. However, as shown in FIG. 9, when a packet distributing function 20' having the same function as the router 20 of FIG. 4 is placed before the link switching function 40', the situation of being unable to transmit the lowest priority packets can be avoided when enough capacity for transmission is left on the higher quality link.

Since the packet distributing device of the invention distributes a series of packets of any particular priority to a plurality of links, there are cases where the packets arrive out of order. If packets such as bridge protocol-based packets, whose order of arrival must be retained, are included, then, if a priority reassigning function is placed before the packet distributing function, and the highest priority is assigned to such packets regardless of the user assigned priority, the packets can always be distributed to the highest quality link so that the order of arrival of packets can be retained. Any of these functions can be implemented in software.

Figure 10:
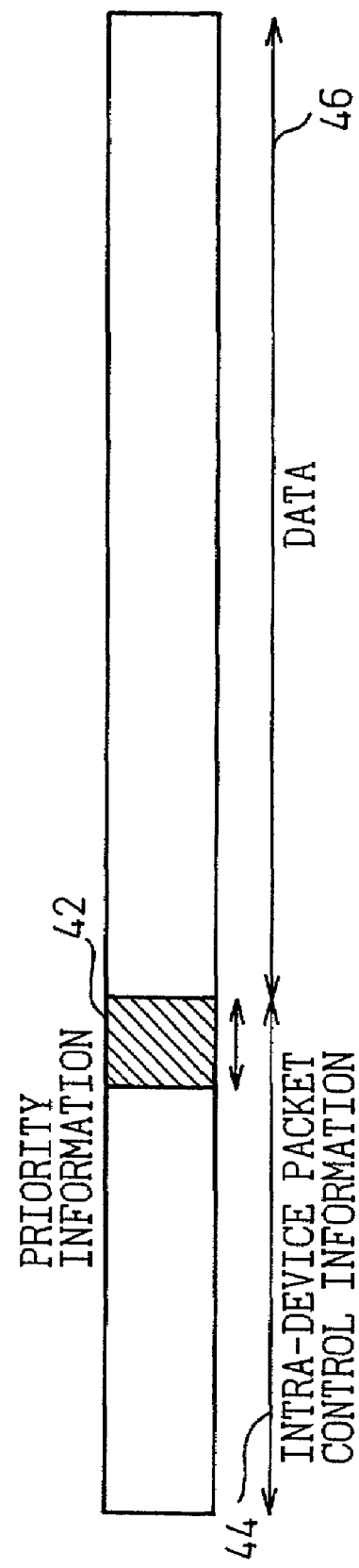
FIG. 10 is a diagram for explaining the addition of priority information to a packet.

FIG. 10 is a diagram for explaining one example of a method of adding priority information to a packet. As shown in FIG. 10, priority information 42 is added to a packet within the device and, based on this information, the packet is distributed. The priority information may be added in the control information field 44 or the data field 46. In the illustrated example, the priority information is added to the control information. The priority information is set by the user, just as the device is set. This feature allows the user to change the priority information, for example, for each destination or in accordance with the data length. The setting can also be made for each protocol address, application, or protocol type.

Figure 11:
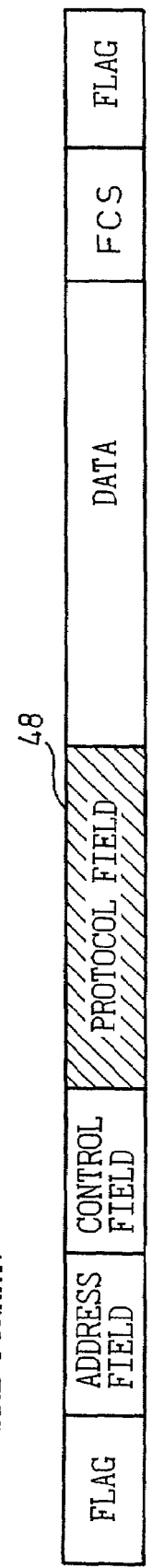
FIG. 11 is a diagram for explaining how priority information is changed.

On the other hand, packets whose order of arrival must be considered must be assigned to the highest priority link regardless of the user set priority information. An example of how this is done will be explained with reference to FIG. 11. If the protocol field 48 indicates Bridge, as in the frame format shown in FIG. 11, since the order of arrival must be guaranteed, the priority information is changed to the one (highest priority) that causes packets to be forwarded to the highest priority link regardless of the user set information.

As described above, when the packet distributing device of the invention is used, effective use can be made of a plurality of links, in order of quality, by just assigning priority according to the content (significance) of each individual packet and, besides, in a network where automatic switching is performed, transmission can be made to a route that has been cut off.

The invention claimed is:

1. A packet distributing device for distributing packets of different priorities to a plurality of links of different qualities in accordance with the priorities of the packets, comprising:

means for comparing link loads in a descending order of quality, with a predetermined threshold value for a plurality of links, having a higher quality than the quality corresponding to the priority of the packet to be transmitted; and means for distributing the packet to one of the plurality of links when the load on the link is found by the comparing means to be not greater than the predetermined threshold value.

2. A packet distributing device according to claim 1, wherein when a failure occurs on one of the plurality of links, forwarding of packets distributed to the lowest quality link is stopped, and packets distributed to the failed link are forwarded on a lower quality link.

3. A packet distributing device according to claim 1, further comprising means for changing preassigned packet priority to the highest priority for any packet whose order of arrival needs to be maintained.

* * * * *